March 19, 1957 L. E. NORTON 2,786,139

FREQUENCY CONTROL SYSTEM

Filed July 27, 1953 2 Sheets-Sheet 1

INVENTOR.
Lowell E. Norton

BY Milton S. Winters
ATTORNEY

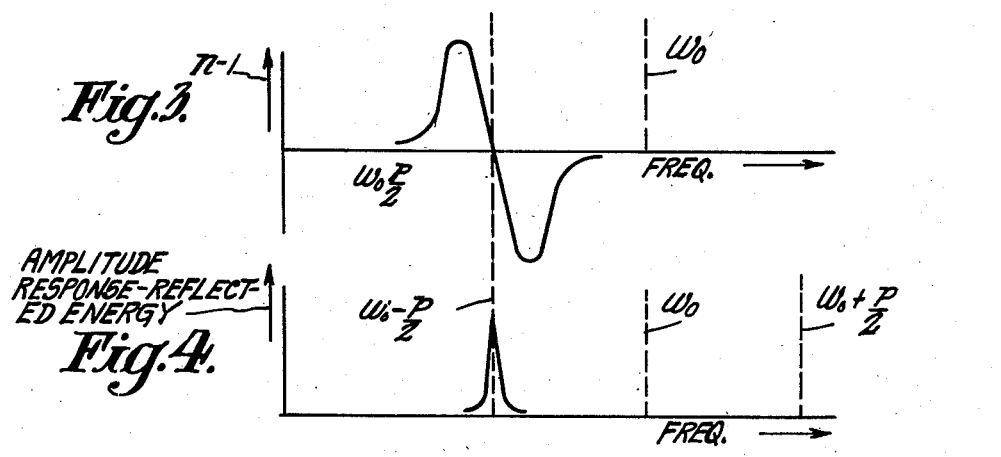

United States Patent Office 2,786,139
Patented Mar. 19, 1957

2,786,139

FREQUENCY CONTROL SYSTEM

Lowell E. Norton, Princeton, N. J., assignor to Radio Corporation of America, a corporation of Delaware Application July 27, 1953, Serial No. 370,290

8 Claims. (Cl. 250—36)

The present invention is directed to frequency control and particularly to gas resonance frequency control.

It is known to control the frequency of a microwave generator by means of a gas cell. The gas cell depends for its operation on gas molecular resonance. The effective Q of such a gas cell may be extremely high. Therefore, the microwave energy control may be highly accurate, and stable.

In order to provide still higher effective Q, a reduced spectral line band-width of the gas at the resonant frequency may be employed. The band-width contribution due to intermolecular collisions may be reduced by pressure reduction. The band-width contribution due to wall collisions may be decreased by increasing the gas container dimensions. Neither measure leads to any greatly reduced band-width because Doppler contribution to the total band-width remains unchanged, and large compared to the other contributions. One way to reduce the Doppler line broadening is to use a Dicke-Newell gas cell. Briefly, this gas cell employs a plurality of grids (or other structure) for producing a field periodic in time and space at a field modulation rate. Such cells are disclosed in the copending application of Robert H. Dicke and George S. Newell, Jr., Serial No. 243,082, filed August 22, 1951, entitled "Molecular Resonance System and Method," now Patent No. 2,749,443, issued June 5, 1956. In the normal operation of the Dicke-Newell gas cell, a field modulation oscillator is employed. Then microwave energy incident on or applied to the cell at a frequency above (or below) the unperturbed or undisturbed gas resonance by half the modulating frequency causes a coherent re-radiation or reflection from the gas of the cell in constructive fashion. The re-radiated or reflected energy may be readily separated from the incident energy because such reflected energy is below (if the incident energy is above) or above (if the incident energy is below) the undisturbed gas resonance frequency by half the field modulation frequency. Moreover, this reflected energy has the characteristics, such as anomalous dispersion, of a gas resonance or spectral line except that it is displaced in frequency from the undisturbed gas resonance by half the modulating frequency.

Different systems are known for making use of the high Q characteristics of the Dicke-Newell cell. Reference may be made, for example, to the said application of Dicke-Newell, to my copending application Serial No. 338,062, filed February 20, 1953, entitled "Gas Cell Frequency Control"; to my copending application Serial No. 351,182, filed April 27, 1953, entitled "Controlled Frequency Microwave Generation"; and to my copending application Serial No. 365,178, filed June 30, 1953, entitled "Gas Resonance Frequency Control."

It is an object of the present invention to provide a novel and improved frequency control system employing a Dicke-Newell gas cell and different from those heretofore known employing a Dicke-Newell gas cell.

Another object of the invention is to provide an improved frequency stabilization system for a microwave generator wherein the generator frequency is substantially off-set from the gas resonance frequency by a different amount than the field modulation frequency.

A further object of the invention is to provide a frequency control system employing a Dicke-Newell gas cell in which the detection of the components highly sensitive to frequency shift in the re-radiated or coherently reflected energy from the gas cell is characterized by an improved signal-to-noise ratio.

In accordance with the invention, a microwave generator is modulated by a generator modulation oscillator at a frequency different from the field modulation oscillator frequency of a Dicke-Newell gas cell. The components from the microwave generator and its modulation sidebands are applied to this gas cell. Energy is coherently reflected due to selection of a sideband frequency to be displaced by half the field modulation frequency from the undisturbed gas resonance frequency. The coherent reflection is highly sensitive in phase to the microwave generator frequency due to anomalous dispersion. The coherent reflection (and the sidebands) is detected and filtered after detection to pass only a band near the field modulation oscillator frequency. The detected beat frequency is also highly sensitive in phase to the generator frequency. The resultant beat frequency, if at the field modulation frequency, may be phase detected against the field modulation oscillator frequency. The phase comparison provides a frequency sensitive voltage which, if desired, may be applied to control the microwave generator frequency. The microwave generator frequency is thus stabilized at a selected one of certain off-set frequencies.

In another preferred embodiment of the invention, a first detection including detection of the coherently reflected energy provides certain frequency components which are amplified and filtered to pass a band of frequencies in the neighborhood of the generator modulation oscillator frequencies. The frequencies in this band may be detected in a second detector to provide a component near the field modulation oscillation frequency which is applied to a phase comparison detector as before. The phase comparison detection provides a frequency control voltage which may be applied to a frequency control voltage-responsive element of a microwave generator.

In each case, the detected voltage having the field modulation oscillation frequency (at least nominally) is highly sensitive in phase to departures of the assigned off-set frequency of a microwave generator from the resonance frequency. The resonance frequency is always displaced by half the field modulation oscillator frequency from the undisturbed gas resonance frequency. By selection of the field modulation frequency, a wide continuous selection of controlled frequencies is readily possible.

The foregoing, and other objects, advantages, and novel features of the invention will be more fully apparent from the following description when taken in connection with the accompanying drawing, in which like reference numerals refer to similar parts, and in which:

Figs. 3 and 4 are graphs useful in understanding the operation of the Dicke-Newell gas cell; and Fig. 5 is a block diagram schematically portraying another embodiment of the invention.

Figure 1:
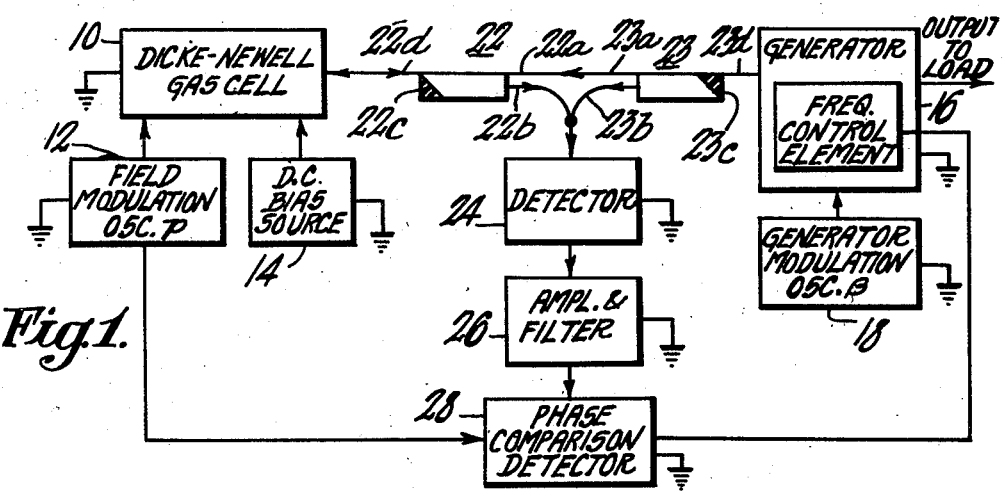
Fig. 1 is a diagram schematically portraying one embodiment of the invention.

Referring to Fig. 1, a field modulation oscillator 12 of frequency $p$ is connected to a Dicke-Newell gas cell 10. A D. C. (direct current) source 14 may also be connected to the gas cell 10. A microwave generator 16 having a frequency of oscillations $\omega$ is modulated by a generator modulation oscillator 18 of frequency $\beta$. The modulated output of the microwave generator 16 is applied to the Dicke-Newell gas cell 10. The coherently reflected or re-radiated energy from the gas cell 10 passes through a directional coupler 22 to a detector 24. The directional coupler 22 may be considered as having two pairs of conjugate arms, each pair of conjugate arms being de-coupled from the other arm of the same pair for energy incident on the coupler. For example, the arms 22a and 22b are conjugate pairs, and energy incident from arm 22a on the coupler 22 is not coupled to the arm 22b, some of the energy passing away from the coupler over arm 22d and some of the energy being absorbed in the absorptive termination of arm 22c. Such couplers (for example, long slot couplers) are well known and the coupler 22 is schematically indicated in a conventionalized manner understood in the art. The energy returning from the cell along the arm 22d passes out through arm 22b part passing through 22a. A second directional coupler 23 may be employed inserted between the generator 16 and the directional coupler 22. Use of this directional coupler is optional. The system is operative without it if there are sufficient imperfections in the one way properties of the first directional coupler, or if mismatch reflections from the absorption cell are great enough. The second directional coupler 23 couples energy directly from the arm 23d leading from the microwave generator 16 toward an arm 23b coupled into the detector 24. The arms 22b and 23b meet at a junction which is preferably reflectionless and leads substantially all the energy from each arm into the detector 24. The detector 24 is connected to an amplifier and filter 26. The amplifier and filter 26 is connected to a phase comparison detector 28. The phase comparison detector 28 also receives energy at the field modulation oscillator rate $p$ from the field modulation oscillator 12. The output of the phase comparison detector 28, responsive to the difference in phase between the oscillations of field modulation oscillator 12 and those detected by the detector 24 are applied to a frequency control element 30 of the microwave generator 16.

Figure 2:
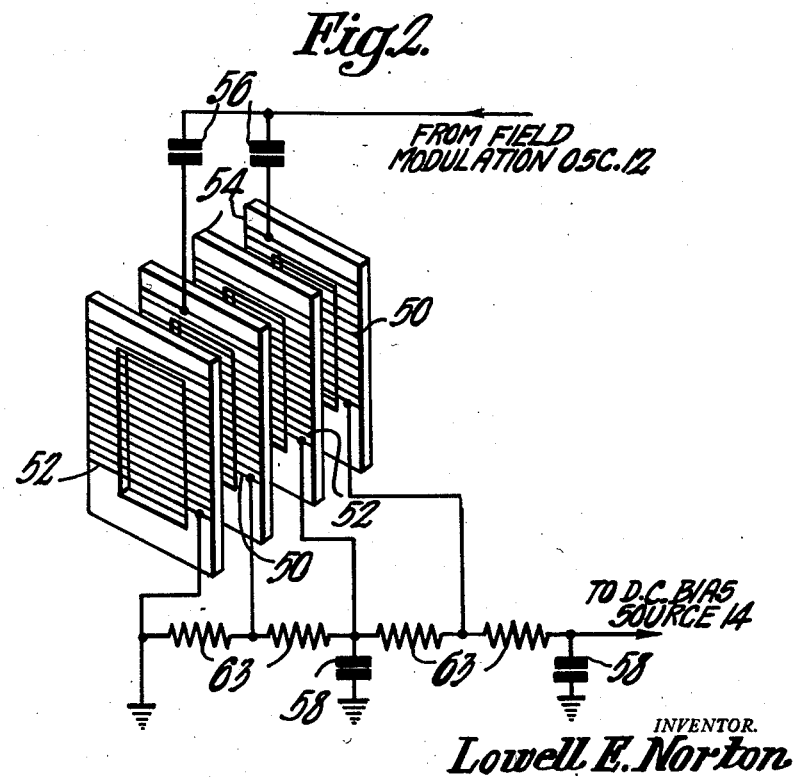
Fig. 2 is a perspective view of a portion of the Dicke-Newell gas cell employed in Fig. 1.

The Dicke-Newell gas cell 10 may be described as a gas cell having means for providing a field periodic in time and space. One form of the gas cell internal structure is illustrated in Fig. 2. Other forms of gas cell are disclosed in the above-identified application of Robert H. Dicke and George S. Newell, Jr. A series of planar grids, alternate ones indicated as 50 and 52, all with wires parallel to a predetermined direction (shown horizontal) are mounted on metallic frames 54. The grids are dielectrically spaced apart preferably at a quarter of the wavelength of the undisturbed gas molecular resonance frequency $\omega_0$. The modulation oscillation from the field modulation oscillator 12 may be applied through blocking capacitors 56 to alternate grids 50. A D. C. bias voltage, if required, may be applied by tapping off a series of voltage dividing resistors 63. The capacitors 58 by-pass any radio frequency (microwave) voltages on the other alternate grids 52. The grids 50, 52 are enclosed in an envelope (not shown) filled with the desired gas at reduced pressure, thus to be immersed in the gas. The microwave energy is applied to travel in a direction normal to the plane of the grids 50, 52, and polarized with the electric vector normal to the grid wires, to allow passage of the energy without serious obstruction by the grids, as shown in said Dicke-Newell application. Under these conditions, there are coherent reflections or re-radiation from the molecules of the gas. At either frequency $\omega_0 \pm p/2$ for the incident energy the reflections are coherent or constructive. The phenomenon is due to the spatial periodic and time periodic field between the grids. The D. C. voltage or field between grids is used with some molecules, as $NH_3$, where the Stark shift is quadratic and by virtue of the cross product term produces a desired linear frequency shift due to a Stark field, where otherwise the shift would be quadratic with applied field. If the shift of the gas frequency employed is linear with applied field, as with some gases, then the D. C. field may be omitted.

The time and spatial periodic fields give rise to two travelling Stark waves, either one of which may be employed. One wave travels in the direction of the incident microwave energy, and the other in the reverse. Due to the shift in the resonant frequency of the gas in adjacent "laminations" enclosed by adjacent grids, and to the quarter wave thickness of each lamination, constructive reflections are received only from one velocity class of molecules moving in the direction (or the reverse) of the incident wave. Therefore, when the incident energy is $p/2$ above the undisturbed gas resonance (or $\omega_0 + p/2$) molecules moving in the same direction as the incident energy are resonated at frequency $\omega_0$ referred to the moving molecules because of a Doppler shift. The reflected energy, also due to a Doppler shift, is reflected and received at frequency $\omega_0 - p/2$. The reflected line, like the gas resonance line, exhibits anomalous dispersion, as shown in Fig. 3 where $n$ is the index of refraction, and also a resonance line, as shown in Fig. 4, only one resonance line being shown, namely that one occurring when the incident frequency passes through $\omega_0 + p/2$, giving rise to the line shown at $\omega_0 - p/2$. Another line at $\omega_0 + p/2$ resulting when the incident energy is at $\omega_0 - p/2$, is not shown. The term resonance line used in this sense is intended to be interpreted as the spectral distribution of energy in the coherent reflection.

For further details and a more complete explanation of the gas cell operation, reference may be made to the aforesaid copending application of Dicke-Newell.

In the operation of the arrangement of Fig. 1, the microwave generator 16 may be frequency modulated over an interval $\Delta\omega$ at the rate $\beta$. For this purpose the generator modulation oscillator 18 may be connected to the frequency control element 30 with suitable filtering (not shown) if necessary to prevent interference between the different sources of voltage applied to the frequency control element 30; these being separated by suitable frequency intervals. The ratio $\Delta\omega/\beta$ is chosen so that the higher side frequencies customarily expected in frequency modulation are negligible, and the output from the microwave generator 16 may be written as $$e = E\{J_0(\Delta\omega/\beta) \cos \omega t + J_1(\Delta\omega/\beta) \cos (\omega-\beta)t - J_1(\Delta\omega/\beta) \cos (\omega+\beta)t\} \quad (1)$$

Where $J_0$ and $J_1$ are the Bessel functions of the zero and first order respectively, and E is an amplitude factor. The nominal carrier frequency of the microwave generator 16 according to the invention, is selected to be any one of the following four frequencies $$\omega = \omega_0 \pm \beta - p/2 \quad (2)$$
$$\omega = \omega_0 \pm \beta + p/2$$

In which $\omega_0$ is the unperturbed spectral line frequency. For purposes of illustration, the carrier frequency $\omega$ is selected to be $\omega_0 - \beta - p/2$, and $\omega + \beta = \omega_0 - p/2$ is an upper side-band frequency. It will be understood that by similar argument the illustration could be made for any of the other three frequencies. With the particular one selected, a coherent reflection is derived from the gas cell at frequency $$\omega_0 + p/2 = \omega + \beta + p \quad (3)$$

due to the side-band energy at $\omega + \beta = \omega_0 - p/2$ incident on the gas cell 10, but with a phase $\phi_g$, where $\phi_g$ depends on $n$ (the index of refraction, see Fig. 3). $\phi_g$ is highly sensitive to frequency variation and critically dependent on the frequency. The directional coupler 22 may be deliberately mismatched, so that some of the original carrier frequency component plus the sideband frequencies as set forth in Equation 1 also appear in the arm 22b leading to the detector 24. If desired, the original carrier plus the side frequencies may be introduced by means of the directional coupler 23 and the arm 23b which joins the arm 22b at a preferably reflectionless junction. Thus the second directional 23, may be omitted if other means are employed for introducing the original carrier and sideband frequency from the microwave generator 16 to the detector 24. The input to the detector 24 may therefore be written as $$e_1 = kE\{\alpha \cos(\omega t + \phi_c) + b \cos[(\omega - \beta)t + \phi_L] - c \cos[(\omega + \beta)t + \phi_\mu] + d \cos[(\omega + \beta + p)t + \phi_r + \phi_g]\} \quad (4)$$

where $\alpha$, $b$, $c$, and $d$ are appropriately amplitude coefficients, and $\phi_c$, $\phi_L$, $\phi_\mu$, and $\phi_r$ are phase constants due to effective path lengths.

The amplifier and filter 26 passes only a band of frequencies near the frequency $p$. It will be understood that the filter may be separate, or that the filter and amplifier may be an ordinary I. F. (intermediate frequency) amplifier. Of the beat frequencies introduced by the detector 24, all will be filtered out except those in the neighborhood of $p$, the amplifier output will be $$e_a = k_1 E \cos(pt + \phi_r - \phi_\mu + \phi_g) \quad (5)$$

where $k_1$ is an amplitude factor.

For spectral line work, the excitation and reflected frequency may be, for example, near 24 times $10^9$ C. P. S. and $p$ may be about 25,000 C. P. S. The effective path length phases $\phi_r$ and $\phi_\mu$ may be made to differ by a very small amount, for example by less than a factor of $10^{-6}$, therefore, the difference $\phi_r - \phi_\mu$ is practically independent of changes due to thermal path length changes.

The phase $\phi_g$ of the amplifier output $e_a$ is compared with the reference phase from the field modulation oscillator 12 in the phase comparison detector 28, to derive a frequency control voltage having sensing and which is applied to the frequency control element 30 of the microwave generator 16. The frequency control voltage from the phase comparison detector 28 may be assumed to vary at a somewhat slow drift rate much less than the frequency $\beta$ of the generator modulation oscillator 18. Therefore, frequency separation between the two frequencies applied to the frequency control element 30, to prevent cross-effects ("cross-talk") is quite easy to accomplish, as well understood in the art.

The arrangement of Fig. 5 is similar to that of Fig. 1, except that two detectors are employed. Again, the application of the sideband frequency to the first detector 24 over a separate path by means including, for example, a second direction coupler 23, is optional. One may rely on imperfections in the directional coupler 22 or deliberately introduced reflections, or other means for applying the desired frequency components to the first detector 24. As before, the output of the first detector 24 is supplied to an amplifier and filter 26. A second detector 32 is inserted between the amplifier 26 and the phase comparison detector 28. In the arrangement of Fig. 5, the amplifier and filter 26 is arranged to pass a band of frequencies in the neighborhood of the frequency $\beta$. The second detector 30 is arranged to detect components of frequency $p$, and to by-pass the normally higher frequency components $\beta$ or the like.

In the operation of the arrangement of Fig. 5, the modulation of the microwave generator 16 at frequency $\beta$ is AM (amplitude modulation) rather than FM (frequency modulation). The modulated output of the microwave generator 16 may be writen as $$e' = E_a\{\sin \omega t + m/2 \cos(\omega - \beta)t - m/2 \cos(\omega + \beta)t\} \quad (6)$$

where $m$ is the modulation factor, and $E_a$ is an amplitude factor.

As before, the system operates for $\omega$ adjusted to any of the frequencies indicated in the Equations 2. As before, for purposes of illustration, the microwave generator 16 carrier frequency may be selected as $$\omega = \omega_0 - \beta - p/2 \quad (7)$$

in which case, as before, a coherent reflection from the Dicke-Newell gas cell 10 is obtained at frequency $$\omega_0 + p/2 = \omega + \beta + p \quad (8)$$

due to the incidence of the upper side-band energy on the Dicke-Newell gas cell 10. Furthermore, the coherent reflection at the spectral line given by Equation 8 is frequency dependent in a critical manner with a phase $\phi_g$ as before. The input to the first detector 24 may therefore be written as $$e_1 = kE_a\{a \sin(\omega t + \phi_c) + b \cos[(\omega - \beta)t + \phi_1] - c \cos[(\omega + \beta)t + \phi_\mu] - d \cos[(\omega + \beta + p)t + \phi_R + \phi_g] \quad (9)$$

where the constants have a significance similar to those in Equation 4 above, but are, of course, actually different numerically. The similarity between Equations 4 and 9 is apparent and differences are due to the fact that in one case the microwave generator 16 is frequency modulated, while in the second case, that of the arrangement of Fig. 5, the microwave generator 16 is amplitude modulated.

The amplifier and filter 26 is now arranged to pass a band of frequencies near $\beta$, and preferably $\beta$ is much greater than $p$. Thus the frequency $\beta$ may be a normal I. F. frequency of several megacycles, whereas the frequency $p$ may be in the neighborhood of 25,000 c. p. s. Actually, it is desired that the amplifier and filter 26 pass the frequency $\beta$ and the frequencies differing from $\beta$ by the frequency $p$ and exclude other frequency components. Thus there is applied to the second detector 30 one component at frequency $\beta$ and phase $$[\beta t + (\phi_c - \phi_1)] \quad (10)$$

another component at frequency $\beta$ and phase $$[\beta t + (\phi_\mu - \phi_c)] \quad (11)$$

and finally a component at frequency $\beta + p$ at phase $$[(\beta + p)t + (\phi_g + \phi_r - \phi_c)] \quad (12)$$

Now the effective path lengths are chosen so that $$\phi_\mu - \phi_c = \phi_c - \phi_1 = S\pi \quad (13)$$

where $S$ is any integer. Then the first detector 24 will be at similar points on a standing wave which may exist for each of the three frequency components at frequencies $\omega$, $\omega + \beta$ and $\omega - \beta$. Undesirable phase changes due to thermal path length changes are also small for this initial condition. In the arrangement of Fig. 5, the components at frequencies $\beta$ with phases $$[\beta t + (\phi_c - \phi_1)] \text{ and } [\beta t + (\phi_\mu - \phi_c)]$$

add to give a larger term at a resultant fixed phase and frequency $\beta$, than in the arrangement of Fig. 1. This resultant term of frequency $\beta$ beats with the term of frequency $(\beta + p)$ and phase indicated by Expression 12 above in the second detector 30, to give a term of frequency $p$ and a phase as expressed by $$[pt + (\phi_g + \phi_r - \phi_c)] \quad (14)$$

The phase of the term at frequency $p$ from the second detector 30 is compared in phase with the oscillations from the field modulation oscillator 12 as a reference voltage in the phase comparison detector 28. A nonambiguous frequency control voltage is thus obtained which is applied to the frequency control element 30 of the microwave generator 16.

The invention thus described provides a novel frequency control arrangement in which a microwave generator is modulated, and one of the side-band frequencies is applied to a Dicke-Newell gas cell subject to the customary field modulation oscillations. The coherent reflections from the Dicke-Newell gas cell 10 are detected with the carrier and side-band energy from the microwave generator 16 to provide an output which may be compared in phase at the field modulation frequency with energy from the field modulation oscillator to provide a frequency control voltage. Preferably, a second detector is employed, as in Fig. 5, a first detection being used to detect frequencies in the neighborhood of the generator modulation oscillator frequency, and thereafter a second detection being employed to recover the pseudo sideband frequency $p$, which is then compared in phase with energy from the field modulation oscillator to provide a frequency control voltage for the microwave generator.

What is claimed is:

1. A system comprising a microwave generator having a frequency control element, means to modulate the said generator to provide a carrier frequency and at least one side-band frequency, a gas cell of the type having means to provide a field periodic in space along an axis of said cell and periodic in time connected to receive said sideband energy, a field modulation oscillator connected to said gas cell means to provide said periodic field, and means to stabilize the carrier frequency of said modulated energy at a frequency displaced from an undisturbed gas resonance frequency by the generator modulation frequency and the resultant further displaced by half the field modulation frequency, said frequency stabilizing means comprising a detector connected to receive phase coherent energy reflected from said gas cell and also connected to receive said generator carrier frequency, a filter connected to said detector, and a phase comparison detector connected to said filter to compare the phase of the field modulation oscillations and the output of said filter to provide a frequency control voltage.

2. The system claimed in claim 1, further comprising means to apply said frequency control voltage to said frequency control element.

3. A system comprising a microwave generator having a frequency control element, means to modulate the said generator to provide a carrier frequency and at least one sideband frequency, a gas cell of the type having means to provide a field periodic in space along an axis of said cell and periodic in time, a field modulation oscillator connected to said gas cell means to provide said periodic field, and means to stabilize the carrier frequency of said modulated energy at a frequency displaced from the undisturbed gas resonance frequency by the generator modulation frequency and the resultant further displaced by half the field modulation frequency, said frequency stabilizing means comprising a detector to receive phase coherent energy reflected from said gas cell and also connected to receive said generator frequency, a filter connected to receive the output of said detector, and a phase comparison detector connected to control by its output said frequency control element and with its input circuits connected to said filter and said modulation oscillator to compare the phases of voltages from said filter and said field modulation oscillator.

4. The system claimed in claim 3, said means to modulate the said microwave generator being frequency modulation means.

5. The system claimed in claim 3, said means to modulate the said microwave generator being amplitude modulation means.

6. The system claimed in claim 5, further comprising a second detector connected between said phase comparison detector and said filter.

7. The system claimed in claim 1, the connection of said detector to receive reflections from said gas cell and the connection of said gas cell to receive said sideband energy including a directional coupler.

8. The system claimed in claim 7, the connection of said detector to receive said generator carrier frequency including a second directional coupler.

References Cited in the file of this patent

UNITED STATES PATENTS 2,591,257    Hershberger _____ Apr. 1, 1952